United States Patent [19]

Bailey

[11] Patent Number: 5,334,970
[45] Date of Patent: Aug. 2, 1994

[54] ALARM SYSTEM

[75] Inventor: Douglas S. Bailey, Deerfield, Ill.

[73] Assignee: Midwesco, Inc., Niles, Ill.

[21] Appl. No.: 887,023

[22] Filed: May 21, 1992

[51] Int. Cl.$^5$ .............................................. G08B 29/00
[52] U.S. Cl. ..................... 340/506; 340/525; 340/605; 340/286.14
[58] Field of Search ................. 340/525, 506, 286.13, 340/286.14, 825.36, 605

[56] References Cited

U.S. PATENT DOCUMENTS

| | | | |
|---|---|---|---|
| 2,651,752 | 9/1953 | Dévot | 73/40.5 R |
| 4,612,797 | 9/1986 | Barkhoudarian | 73/40.5 R |
| 4,797,621 | 1/1989 | Anderson et al. | 73/40.5 R |
| 4,910,998 | 3/1990 | Willis et al. | 73/40.5 R |
| 5,087,874 | 2/1992 | Robinson | 324/73.1 |
| 5,189,394 | 2/1993 | Walter et al. | 340/525 |

OTHER PUBLICATIONS

"Proceedings 1987 Carnahan Conference on Security Technology: Electronic Crime Countermeasures" Jul. 1987, J. C. Smart pp. 1-5.
Autodesk, Inc., Manual AC11RM, "AutoCAD® Release 11" Aug. 1990.
PermAlert ESP, Manual 92/02 "Pal-At ™, Leak Detection/Location" Jan. 1988.

Primary Examiner—Donnie L. Crosland
Attorney, Agent, or Firm—Fitch, Even, Tabin & Flannery

[57] ABSTRACT

An alarm system includes alarm monitoring subsystems coupled by communication links to a central alarm processing subsystem. Each alarm processing subsystem includes sensor strings for detecting alarm conditions in a monitored region and means for locating a detected alarm condition along the length of a sensor string. An alarm message including a system identifier, a sensor string identifier and the distance of the alarm condition along the sensor string is communicated to the alarm processing system. The alarm processing system displays a stored representation of the monitored region when an alarm message is received. The system and sensor identifiers and the cable distance data are used to convert the cable distance into the coordinates of the physical location of the alarm condition and a marker of the alarm condition id displayed with the representation of the monitored region.

12 Claims, 4 Drawing Sheets

Microfiche Appendix Included
(1 Microfiche, 29 Pages)

ALARM SYSTEM

REFERENCE TO MICROFICHE APPENDIX

Appendix I consists of one (1) microfiche with twenty-nine (29) frames.

FIELD OF THE INVENTION

The present invention relates to alarm systems and more specifically to a system and method for displaying the location of a monitored alarm condition.

DESCRIPTION OF THE PRIOR ART

Systems are known for monitoring a region or area where alarm conditions can occur and for detecting and locating alarm conditions in the region or area. For example, a known leak detecting and locating system may be used in a pipeline system, or in many other installations where liquid is to be detected. This system includes an elongated electrically conductive cable, or sensor string, subdivided into segments bounded by nodes. The segments may consist of lengths of sensor cable, probe assemblies and jumper cables connected in series. Sensor cable experiences a change in electrical impedence properties when wetted with a liquid as a result of a leak alarm condition. A probe assembly is designed to sense a particular alarm condition and changes its electrical state in the nature of a switch if the alarm condition occurs. Jumper cable is used to interconnect other segments in regions where alarm condition detection is not required.

In this known system, electrical pulses are applied to the sensor string. A waveform is reflected from the sensor string. The waveform includes cable distance, determined from wave propagation and reflection time, as the horizontal axis and voltage as the vertical axis. When an alarm condition occurs, the reflected waveform voltage changes as a result of the change in the electrical performance of a sensor cable or probe. A reference waveform is stored for comparison with waveforms reflected while the sensor string is monitored. When the comparison indicates an alarm condition such as a leak or a break or short circuit along the cable, the location of the alarm condition is determined and an alarm message is generated. This change occurs at a region along the horizontal axis, and the relationship between time and distance is used to determine the location of the alarm condition. The system can include a number of sensor strings, and can continuously monitor all of the sensor strings. U.S. Pat. No. 4,797,621 discloses a leak detecting and locating system of this type.

Leak detecting and locating systems have been connected by communication links to a central monitoring facility. In a known system of this type, the central facility repetitively interrogates one or a series of remote locations. When an alarm message is generated at a remote location, an indication is provided at the central facility, and information including a system and cable identifier and the content of the alarm message is made available to an operator at the central facility.

In known systems, the alarm message is in the form of textual information. An alarm message may include an identification of the sensor string in which an alarm condition is detected, together with information about the alarm condition. This information may consist of a description of the type of alarm condition detected, for example a leak or a short or break in the sensor string, and a statement of the location of the detected alarm condition.

In order to evaluate the nature and severity of the detected alarm condition and to take corrective action if appropriate, the user must determine the physical location of the alarm condition. For example, in a monitored pipeline system, the user learns from the alarm message that the alarm condition is a certain distance along the sensor string from the beginning of the sensor string. Using a drawing of the monitored pipeline system, the user must ascertain the physical location of the alarm condition. A disadvantage with this approach is the inconvenience and delay that can be involved in locating the needed drawing and calculating the physical location from the alarm message. In a serious alarm condition where a speedy response can avert grave consequences, such a delay can be catastrophic.

SUMMARY OF THE INVENTION

It is an object of this invention to provide an alarm system wherein the physical location of an alarm condition is apparent to the user. Another object is to provide improvements in alarm systems and methods known in the past.

In brief, in accordance with the present invention there is provided an alarm system for detecting and locating alarm conditions in monitored regions shown in drawings and for displaying alarm information. The system includes an alarm monitoring subsystem for each monitored region having a sensor string containing at least one alarm condition responsive sensor section. The alarm monitoring subsystems each include means for detecting the existence of an alarm condition in the sensor string and means for locating the alarm condition at a linear distance along the length of the sensor string. The alarm monitoring subsystems each further include means for providing an alarm message having a numerical representation of the linear distance. The alarm system includes an alarm processing subsystem and a communication link connected between alarm monitoring subsystems and the alarm processing subsystem. The communication link includes means for communicating an alarm message from each of the alarm monitoring subsystems to the alarm processing subsystem. The alarm processing subsystem includes a graphical display device and means for repeating the alarm message upon the graphical display device. The alarm system is characterized by the alarm processing subsystem including stored representations of the drawings of the monitored regions in a form capable of being displayed on the graphical display device. Means responsive to receipt of an alarm message from one of said alarm monitoring subsystems selects the stored representation of the corresponding monitored region. Means is provided for displaying the selected stored representation on the graphical display device. Means is provided for converting the representation of the linear distance into the physical location of the alarm condition in the selected stored representation and means is provided for superimposing an alarm location indicator at the physical location upon the stored representation displayed on the graphical display device.

BRIEF DESCRIPTION OF THE DRAWINGS

The invention and the above and other objects and advantages may best be understood from the following detailed description of the embodiment of the invention shown in the accompanying drawings, wherein.

DETAILED DESCRIPTION OF THE INVENTION

Figure 1:
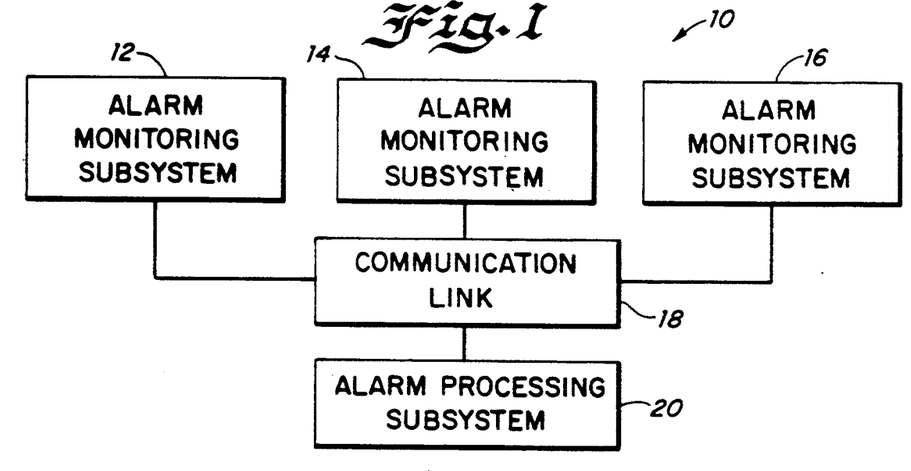
FIG. 1 is a schematic block diagram of an alarm system in accordance with the present invention.

Having reference now to the drawings, FIG. 1 is a schematic block diagram of an alarm system generally designated as 10 and constructed in accordance with the principles of the present invention. System 10 includes a number of alarm monitoring subsystems 12, 14 and 16. In a preferred embodiment of the invention the number of alarm monitoring subsystems may be in the range of one to 254. Each alarm monitoring subsystem 12, 14 and 16 may be similar to the others and each operates on a stand alone basis independently of the others, and each is connected by a communication link 18 to an alarm processing subsystem 20. The alarm processing subsystem may be located at a central facility and some or all of the alarm monitoring subsystems may be remote from the alarm processing subsystem 20.

The principles of the invention may be applied to alarm detecting and locating installations responsive to alarm conditions of various types. For example, each alarm monitoring subsystem could be a security system responsive to intrusion or motion detection alarm conditions or a fire detection system responsive to heat, flame or smoke alarm conditions or others. In the preferred embodiment of the invention, the alarm monitoring subsystems 12, 14 and 16 are leak detecting and locating systems.

Figure 2:
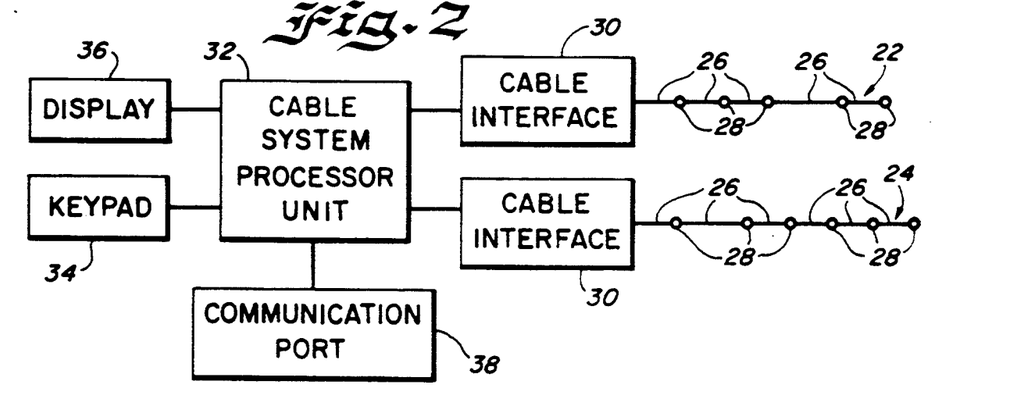
FIG. 2 is a schematic block diagram of an alarm monitoring subsystem of the system of FIG. 1.

Alarm monitoring subsystem 12 is typical of subsystems 14 and 16 as well and includes a pair of sensor strings 22 and 24 shown schematically in FIG. 2. Each sensor string 22 and 24 is constituted of a number of segments 26 that are connected in series circuit relationship with one another and bounded by nodes 28. Each segment 26 may be a length of sensor cable, a probe assembly or a jumper cable. Jumper cable segments are not responsive to alarm conditions are used to extend electrical connections between other active segments of the sensor string 22 or 24.

Sensor cable segments may be coaxial cable that responds to wetting by a liquid to be detected in such a way that its characteristic impedance changes. A further description of one type of sensor cable beyond that necessary for an understanding of the present invention may be found in U.S. Pat. No. 4,910,998 incorporated herein by reference.

A probe assembly typically includes a device that changes between two electrical states depending upon the presence or absence of a condition to be detected. An example is a float operated switch located at a known elevation in a liquid tank that is operated from a closed circuit to an open circuit state when liquid rises to the elevation of the float. Many other types of probes are known, including probes that are sensitive to specific liquids such as hydrocarbons or the like. In addition to the probe device, a probe assembly may include a standard or predetermined length of cable for connecting the probe device in the sensor string. In addition, if a normally open probe device is used, the probe assembly may include provision for polarity reversal.

Sensor strings 22 and 24 are used to detect and locate leaks in monitored regions. For example, a sensor string may be deployed along a buried pipeline system to detect leakage from the pipeline, or may be installed in the interstitial space of secondary contained piping to detect leakage from the carrier pipe and leakage from the surrounding environment into the containment pipe. For another example, a sensor string may be laid out in a pattern in a ceiling or upon a subfloor of a room containing sensitive equipment to detect the presence of liquid before it damages valuable equipment or the environment.

Each of the sensor strings 22 and 24 is coupled through a cable interface 30 to a cable system processor unit 32. Unit 32 is a microprocessor controlled device including random access memory (RAM), programmable read only memory (PROM) containing a program for operating the alarm monitoring subsystem, and electrically erasable read only memory (EEPROM) for holding data such as user passwords, message archives and the like. Each cable interface 30 includes RAM and EEPROM for holding data specific to the connected sensor string, such as reference maps or waveforms, setup data and the like. In a preferred embodiment of the invention, the sensor strings may be up to several thousand feet in length and each alarm monitoring subsystem may include any number of cable interfaces 30 and sensor strings within the range of from one to eight. Additional information about the alarm monitoring subsystem may be found in the publication "PAL-AT Leak Detection/Location Operating Manual", manual No. 92/02, 1992, Midwesco, Inc., PermAlert ESP, incorporated herein by reference.

Repetitive pulses are coupled into the sensor strings 22 and 24 from the cable interfaces 30. A waveform or map is reflected from the sensor strings. A reference waveform for each sensor string is stored in the corresponding cable interface EEPROM and subsequent waveforms are compared with this reference waveform. The reflected waveform changes as a result of changes in the characteristic impedance of the sensor string. If sensor cable is wetted, this results in an alarm condition.

The waveform reflected from a sensor string can be represented as a line in a two axis area in which the vertical axis is voltage amplitude and the horizontal axis is cable length. The origin of the vertical axis is zero volts and the origin of the horizontal axis is the beginning of the sensor string at the point where it is connected to the cable interface 30. If a waveform changes by virtue of a voltage decrease at a region along the horizontal axis, this can indicate an impedance drop due, for example, to sensor cable wetting, and the detected alarm condition can be located in terms of cable length by the position of the change along the horizontal axis. U.S. Pat. No. 4,797,621 incorporated herein by reference may be consulted for additional information about the leak detection technique performed by the alarm monitoring subsystems of the alarm system 10. Other alarm conditions that can be detected by a sensor string include probe activation, cable short circuit, cable break, cable drying and probe reset.

A keypad 34 is connected to the processor unit for user input. A display 36 is provided for output of messages, prompts and the like. The processor unit under program control continuously monitors each of the sensor strings 22 and 24 and generates an alarm message in response to every detected alarm condition. In addition, audible and/or visible alarm indicators may be employed for annunciation of alarm conditions. Messages other than alarm messages, such as status messages and the like, may also be generated by the alarm monitoring subsystem.

A communication port 38 is connected to the cable system processor unit 32. Port 38 may be a standard EIA RS-232 port or have any other known configuration. The port 38 permits the alarm monitoring subsystem 12 to communicate through the communication link 18 with the alarm processing subsystem 20. Depending on the distance separating the alarm monitoring and alarm processing subsystems, the link 18 may include an analog telephone line with telephone modems or direct wired short haul modems such as the LAN-S1 short haul modem available from Lan Systems, Inc., San Francisco, Calif.

Figure 3:
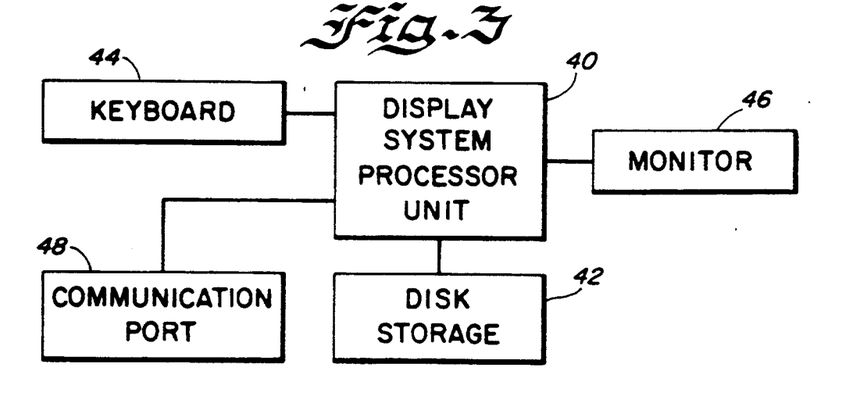
FIG. 3 is a schematic block diagram of the alarm processing subsystem of the system of FIG. 1.

As seen in FIG. 3, the alarm processing subsystem 20 includes a display system processor unit 40. In the preferred embodiment of the invention, the processor unit 40 is a general purpose personal computer based upon a microprocessor such as an i386 microprocessor available from Intel Corporation. The unit 40 also includes internal system RAM and ROM for the storage of system program information as well as a graphics adapter interface, disk controller, keyboard buffer and the like. A disk storage unit 42 is provided for storage of application program information and data. User input is communicated into the unit 40 from a keyboard 44, and output is displayed upon a graphics monitor 46 such as a standard EGA or VGA color monitor. A communication port 48 permits communication with the alarm monitoring subsystems 12, 14 and 16 through the communications link 18.

In the preferred embodiment of the invention, the display system processor unit 40 is operated under the control of a program loaded into RAM from disk storage 42. An exemplary source code for the program to operate the alarm processing subsystem in accordance with the present invention is provided as an Appendix I included in the file wrapper of the application only. This exemplary source code is written in the Microsoft Basic Professional Development System programming language Version 7.1. Alternatively, the invention could be embodied in a dedicated, task specific processor or carried out in other ways.

The user may operate the alarm processing subsystem manually to establish the communication link 18 between the alarm processing subsystem and one of the alarm monitoring subsystems in order to perform a number of different functions. For example, the user may remotely control the connected alarm monitoring subsystem. In this case, input to the remote alarm monitoring subsystem may be entered from the alarm processing subsystem keyboard 44 and messages and prompts from the remote alarm monitoring subsystem may be displayed on the monitor 46. In addition, the user of the alarm processing subsystem may receive a listing of archived messages from the remote alarm monitoring subsystem and recorded waveforms from the remote alarm monitoring subsystem may be transmitted to the alarm processing subsystem for display on the monitor 46.

In accordance with an important feature of the present invention, the alarm processing subsystem is capable of operating in an automatic mode to sequentially query each alarm monitoring subsystem included in the alarm system 10 for alarm messages. In addition, in response to alarm messages, the alarm processing subsystem is able to display a graphical representation of the monitored region in which the alarm condition is detected along with an indication of the actual physical location of the alarm condition.

Figure 4:
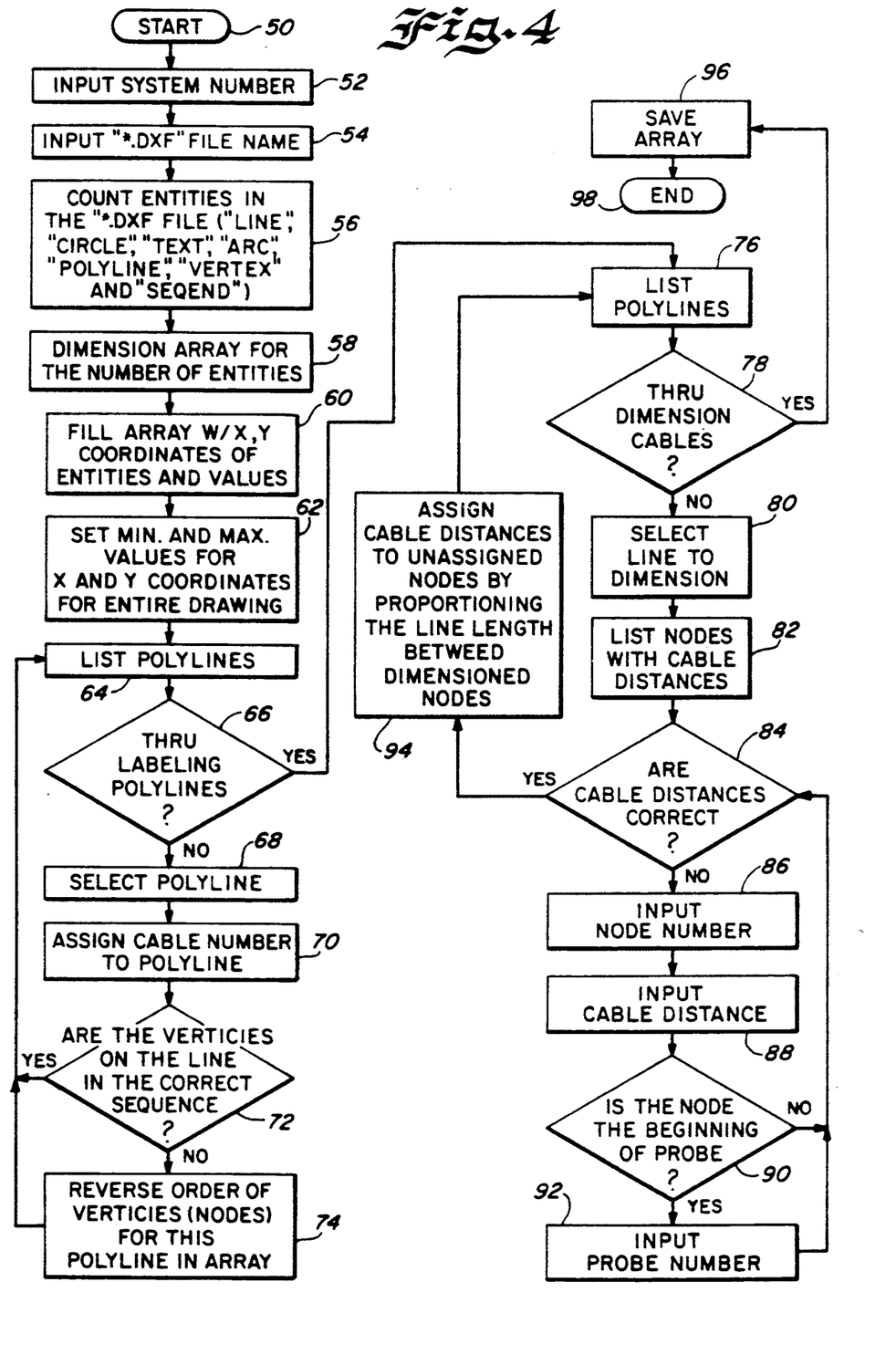
FIG. 4 is a flow chart illustrating a setup routine carried out in the alarm processing subsystem in preparation for the display of the physical location of alarm conditions.

In order to provide the capability for graphical display of a monitored region with an accurately located alarm condition, an array of graphical entities is generated with the process indicated by the flow chart of FIG. 4. Prior to beginning this process, a drawing of the region monitored by the sensor strings of each alarm monitoring subsystem is prepared. Because in the preferred embodiment of the invention the process is carried out using a computer, it is preferred that this drawing be prepared using a computer aided drawing (CAD) program such as AutoCAD available from Autodesk, Inc. This type of drawing can be stored as an American National Standard Code for Information Interchange (ASCII) format file readable in the disk storage unit 42. It is conventional that this type of ASCII drawing file has a "*.DXF" file name format.

As disclosed in more detail in the publication "Auto-CAD Release 11 Reference Manula", Publication AC11RM, Aug. 7, 1990, Autodesk, Inc., pages 527–557 incorporated herein by reference, an ASCII drawing file includes a section listing the drawing entities. Entities are elements such as lines, arcs, points, circles and the like that make up the graphical representation rendered in the drawing. Entities are expressed by data including the entity type and the x and y coordinates of the points, angles and the like defining the entity. One type of drawing entity is a polyline, and it is preferred in carrying out the present invention that all sensor strings be rendered in the region drawing using polylines, and, conversely, that polylines be used for no other purpose in the drawing. A typical polyline entity is a series of lines extending between points represented by vertex entities defined by x and y coordinates. When a sensor string is drawn, the sensor string segments are the polyline entity lines and the nodes are the vertex entities.

FIG. 4 illustrates the procedure for processing an ASCII drawing file to generate an array for displaying of the monitored region with an indication of the physical location of detected alarm conditions. The procedure starts at block 50. The user inputs the system number at block 52. The system number is a number corresponding to the alarm monitoring subsystem monitoring the region being processed. At block 54 the user identifies the file name of the drawing of the region monitored by that alarm monitoring subsystem.

The system under program control reads the ASCII drawing file in program block 56 and counts the number of entities in the file in order to dimension an entity array in block 58. Then in block 60 data from the drawing file representing the drawing entities is loaded into the dimensioned array. In block 62, after the drawing entity information is entered into the array, a determination is made of the largest and smallest values of the x and y coordinates needed to display the entire drawing on the monitor 46.

Blocks 64-74 are a subroutine for interrelating the polyline drawing entities with the sensor strings of the alarm monitoring subsystem corresponding to the monitored region shown in the drawing. As indicated in block 64, a list of the polyline entities is displayed on the monitor 46. At decision block 66, user input establishes completion of a polyline labeling procedure. Until all polylines are assigned a number corresponding to a sensor string identification number, individual polylines are selected by the user in block 68 and given a cable number in block 70.

It is preferred that the nodes of the cables, and thus the vertexes of the polylines, be numbered in ascending sequence beginning with the node closest to the alarm monitoring subsystem cable interface 30. If a polyline is represented in the drawing file with the vertexes in the opposite order, this fact is indicated by the user in decision block 72 and the vertex order is reversed in block 74. From block 72 or 74, the process returns to block 64 and repeats until completion is indicated in block 66.

When the cable assignment subroutine is complete, the procedure branches from block 66 to block 76 where a polyline dimensioning subroutine begins. A list of polylines is displayed on monitor 46 in block 76. In block 78, completion of the cable dimensioning procedure can be established by user input. Before the routine is complete, the user in block 80 selects one polyline or sensor string to dimension and, as indicated by block 82, a list of polyline vertexes or sensor string nodes of the selected polyline or sensor string is displayed on monitor 46. The nodes are listed by the node numbers, as previously reversed in order in block 74 if necessary. This list includes distances of the nodes from the start of the sensor string.

If the distances seen in the list displayed at block 82 are indicated by the user to be incorrect in box 84, as would be the case upon the first iteration of the block 82 list, the user inputs a single node number in block 86 and the corresponding node distance in block 88. The distance that is input at block 88 is a linear distance from the start of the sensor string along the length of the sensor string to the node. This number represents a one dimensional distance corresponding to the distance from the start of the sensor string to the node.

It is desirable to distinguish probe assemblies from other sensor string sections. In block 90 the user identifies those nodes that are the beginning of a probe assembly and in block 92 a probe number unique in the sensor string is assigned. Then, the routine returns from block 90 or block 92 to block 84.

It is not necessary for the user to input cable distances for all nodes. If the sensor string or polyline is drawn to a consistent scale, the user can indicate the correct distances in block 84 with respect to only some of but not all the nodes being dimensioned. At this point, in block 94, the cable distance of other nodes in the sensor string are calculated by the alarm processing subsystem under program control. The program includes data including the cable length of probe assemblies and the capability for proportioning cable distances between nodes when only some distances have been input at block 88.

The polyline entries in the array of drawing entities are augmented with cable numbers from block 70, node distances from blocks 86 and 88 or 94 and probe numbers from block 92. The completed array is a structured list of polylines, vertexes and other entities. When completion of the cable dimensioning subroutine is established by user input at block 78, the array of drawing entities is saved at block 96 and the routine ends at block 98. The array may be used subsequently to display the entities of the drawing on the monitor 46, thereby providing a graphical display of the region monitored by the alarm monitoring subsystem. The procedure is repeated for each of the alarm monitoring subsystems and, as a result, for each alarm monitoring subsystem there is available to the alarm processing subsystem an array of drawing entities useful for graphical display on monitor 46 of the corresponding monitored region.

Figures 5, 6:
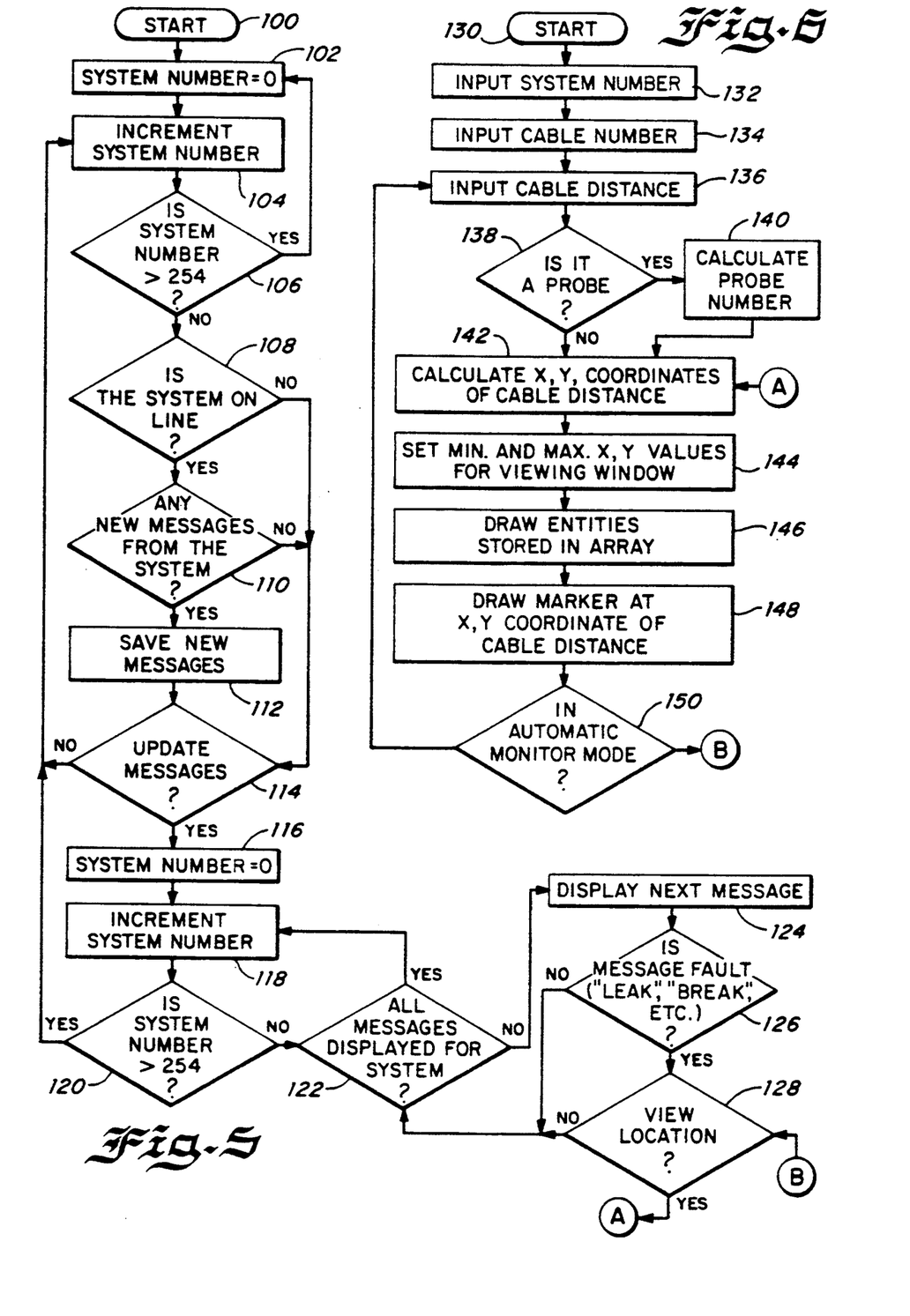
FIG. 5 is a flow chart illustrating a routine in which the alarm processing subsystem repetitively queries alarm monitoring subsystems for alarm messages.
FIG. 6 is a flow chart illustrating a routine for the display of physical alarm condition locations by the alarm processing system.

FIG. 5 is a flowchart of a procedure in which the alarm processing subsystem 20 continuously polls the alarm monitoring subsystems 12, 14 and 16 and any others for messages. Each alarm monitoring subsystem of the alarm system 10 has a unique system number, the lowest system number being one. The procedure reflected in FIG. 5 accommodates an alarm system 10 having 254 alarm monitoring subsystems and system numbers. If there are fewer alarm monitoring subsystems, as in the system seen in FIG. 1, the maximum number can be reduced from 254 in blocks 106 and 120. The procedure starts in block 100, and the system number is set to zero in block 102. In block 104 the system number is incremented, and a check is made in block 106 to determine if the system number exceeds the maximum. If so, the procedure returns to block 102 for reset of the system number to zero.

If the alarm monitoring subsystem identified by the system number is on line, see block 108, an inquiry is made in block 110 for new messages from that alarm monitoring subsystem. A new message is a message issued or generated by the alarm monitoring subsystem since the last inquiry made to that alarm monitoring subsystem by the alarm processing subsystem. If a new message exists, it is saved at block 112. From block 108 or block 110 or block 112 the procedure branches to block 114 where the user has the option to update messages. Unless the user chooses to update messages, the procedure returns from block 114 to block 104 where the system number is incremented and the next alarm monitoring subsystem is queried for new messages. Each alarm monitoring subsystem is queried in sequence in this manner until the system number is incremented beyond the maximum system number in block 106 and the process repeats with a return to block 102.

The user can select the update messages option in block 114. In this event, the system number is set to zero in block 116 and incremented in block 118. In block 120 a check is made to determine if the system number exceeds the maximum system number. For system numbers equal to or less than the maximum system number, a determination is made in block 122 if there are messages from the alarm monitoring subsystem that have not previously been displayed. If there are no undisplayed messages, the procedure returns to block 118 and the system number is incremented. If there are undisplayed messages, the next undisplayed message is displayed on monitor 46 as indicated in block 124.

Messages received from a alarm monitoring subsystem may be an error or fault message, or be of some other type. Each displayed message is screened in block 126. If the message is an alarm message, the user is given the option in block 128 to have the alarm processing subsystem display a graphic representation of the monitored region together with an indication of the physical location of the alarm condition that resulted in the alarm message. If this option is not selected, then the procedure returns to block 122 for display of the next sequential message or return to block 118. If the display option is selected, then part of the procedure of FIG. 6 is performed as indicated by the reference character A.

FIG. 6 is a flowchart of a procedure for manually or automatically displaying a graphical representation of any region monitored by any alarm monitoring subsystem of the alarm system 10 together with an indication of the physical location of a point along a sensor string where an alarm condition is detected or a point along a sensor string selected by the user. The manually controlled procedure starts in block 130. In blocks 132, 134 and 136 the user inputs the system number of an alarm monitoring subsystem for viewing, the number of a specific sensor string or cable of that system, and a cable distance where a physical location indicator is to be displayed. In block 138 the user indicates whether or not the cable distance corresponds to a probe. If so, a probe number is calculated in block 140.

In block 142 a calculation is made in order to find the x and y coordinates of the point in the drawing defined by the cable number and distance. The polyline entity in the entity array corresponding to the cable number is located. Then the two vertexes of the polyline having cable distances next greater than and less than the input cable distance are determined. The input cable distance is now bracketed between these two vertexes. The vector angle between the vertexes is determined. The x and y distances between the vertexes are proportioned to find the x and y coordinates of the cable distance input at block 136.

In block 144 minimum and maximum x and y coordinates are calculated for a viewing window that can be selected for display. The viewing window may be a part of the entire drawing with the alarm location or manually selected location centered.

Each entity stored in the entity array is drawn on the monitor 46. This process is indicated in block 146. Then a marker is drawn at the location that was calculated at box 142. This marker is a visible indication located on the graphical display of the monitored region at the point selected by the user in blocks 132–136 or the point where an alarm condition is detected. For example, the marker may be a flashing spot on the display.

In automatic operation, when the view option is selected by the user in block 128 of FIG. 5, the system number, cable number, cable distance and probe number if applicable from the alarm message are passed to block 142 of FIG. 6 as indicated by reference character A. Then blocks 144, 146 and 148 display the graphical representation of the monitored region and the alarm condition marker as described above. If a determination is made in block 150 that the alarm processing subsystem is operating in automatic mode, then when the display is terminated the procedure returns to block 128 of FIG. 5 as indicated by the reference character B.

Figure 7:
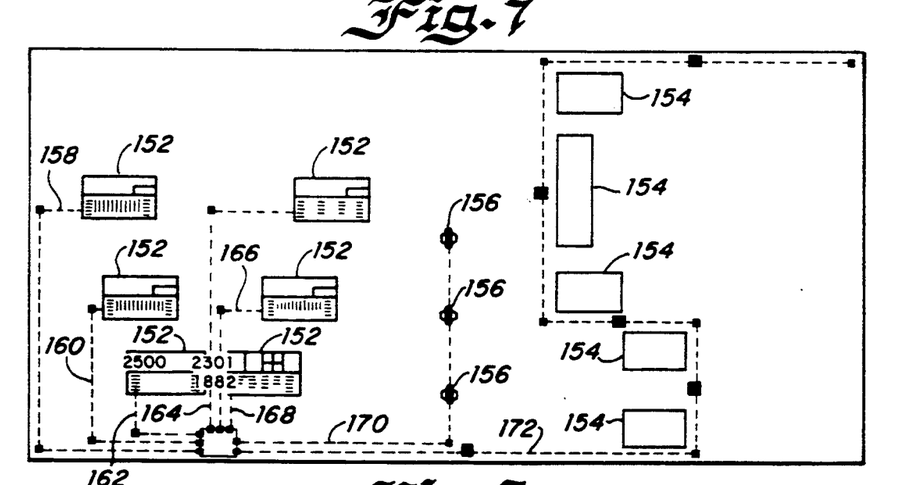
FIGS. 7–9 are illustrations shown at progressively different scales or zoom levels of a display of the physical location of an alarm condition by the alarm processing system.
Figure 8:
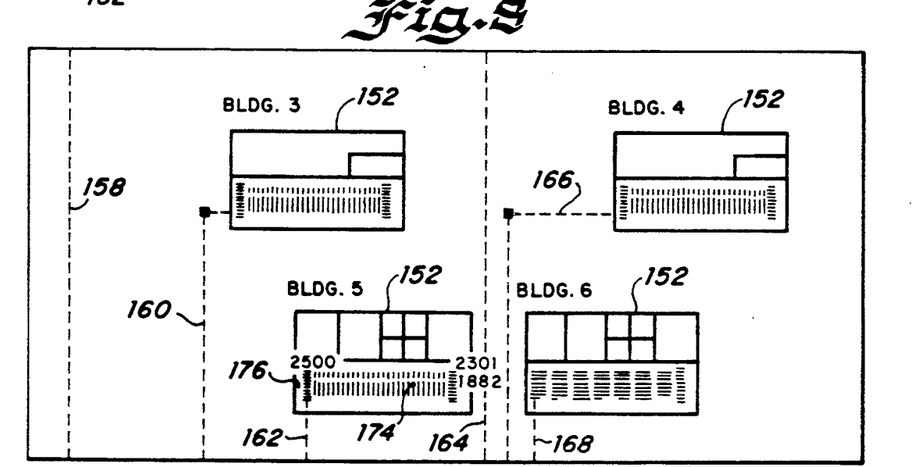
Figure 9:
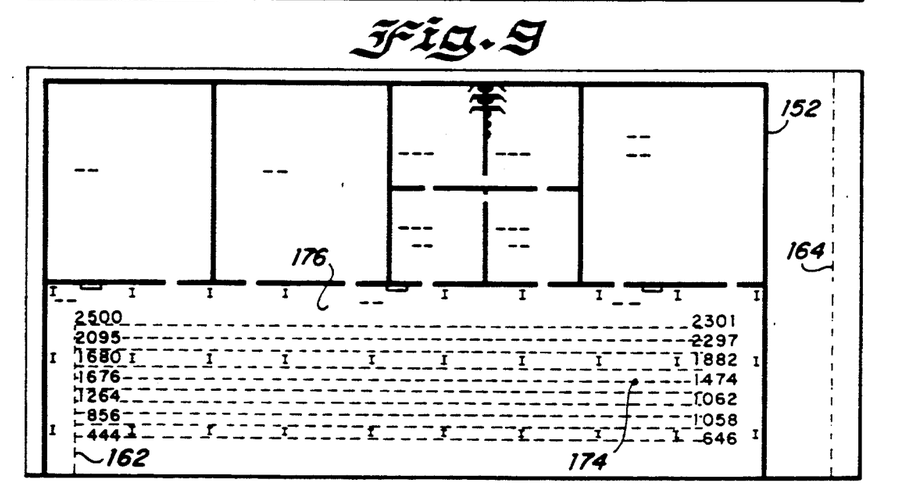

FIGS. 7, 8 and 9 show a graphical representation of a monitored region as displayed on monitor 46 by the routine of FIG. 6. Each of these figures shows the same graphical representation but with different scales or zoom levels.

The entire drawing including all drawing entities from the array generated by the routine of FIG. 4 is seen in FIG. 7. This representation shows the full extent of a monitored area with the full x and y coordinate ranges as calculated in block 62 of FIG. 4. Six buildings 152 are represented at the left side of the display (FIG. 7) and five other structures 154 are represented at the right side of the display. Three liquid tanks 156 are represented near the center. The alarm monitoring subsystem used to monitor the displayed region includes eight sensor strings 158, 160, 162, 164, 166 and 168. These extend along cable paths from the location of the cable system processor unit 32. A marker or indicator 174 of the physical location of an alarm condition detected along sensor string 162 is displayed within one of the buildings 152.

The location of the marker 174 can be seen more clearly in FIG. 8 and even more clearly in FIG. 9. In these figures it can be seen that the sensor string 162 is arrayed in a pattern in a protected room 176 in a building 152. In the displays portrayed in FIGS. 7-9 the cable distances of nodes along the cable or sensor string 162 are displayed in sufficient number depending on the scale to locate the marker 174 in terms of cable length without unduly obstructing the graphical representation. In FIG. 9 most of the sensor string nodes are displayed with cable distance numbers.

When an alarm condition such as that signified by marker 176 is detected, a user at the alarm processing subsystem 20 can immediately locate the exact physical position of the alarm condition without resort to hard copies of drawings and without the necessity for calculating physical position of an alarm condition from the cable distance figure determined from the sensor string reflected waveform. This not only makes it easy and convenient to locate the alarm condition, but also can assist in prompt action to correct an alarm condition before it becomes more serious or causes damage or harm to the environment.

While the invention has been described with reference to details of the embodiment of the invention illustrated in the drawings, these details are not intended to limit the scope of the invention as set forth in the appended claims.

I claim:

1. A leak detection system for detecting and locating leak and fault conditions in a monitored region shown on a display and for displaying leak and fault information, said system comprising:

a leak monitoring subsystem including leak detection cables containing at least one leak and fault condition responsive sensor section;

said leak monitoring subsystem including means for detecting the existence of a leak or fault by said leak detection cables and means for locating the leak or fault condition at a linear distance along the length of said leak detection cables;

said leak monitoring subsystem further including means for providing an informational message including a numerical representation of said linear distance;

a leak signal processing subsystem;

a communication link connected between said leak monitoring subsystem and said leak signal processing subsystem;

said communication link including means for communicating said leak or fault message from said leak monitoring subsystem to said leak signal processing subsystem; and said leak signal processing subsystem including a graphical display device and means for repeating said leak or fault message upon said graphical display device;

said leak detection system being characterized by:

said leak signal processing subsystem including a stored representation of the monitored region in form capable of being displayed on said graphical display device;

means for displaying said stored representation on said graphical display device;

means for converting the representation of said linear distance into the physical location of the leak or fault condition in said stored representation; and means for superimposing a leak or fault location indicator at said physical location upon said stored representation displayed on said graphical display device.

2. A leak detection system as claimed in claim 1 wherein said converting means and said superimposing means are operative in response to communication of said leak or fault message on said communication link from said leak monitoring subsystem.

3. A leak detection system as claimed in claim 2 wherein said displaying means is operative in response to communication of said leak or fault message on said communication link from said leak monitoring subsystem.

4. A leak detection system as claimed in claim 1 wherein said leak detection cables include a plurality of sensor sections bounded by calibration nodes; and said stored representation including a segmented line having sections corresponding to said sections and vertexes corresponding to said nodes.

5. A leak detection system as claimed in claim 4, said converting means including means for using the positions of said vertexes and the lengths of said segments for determining said physical location.

6. A leak detection system as claimed in claim 1 wherein said leak monitoring subsystem includes a plurality of leak detection cables and said leak or fault message includes a leak detection cable identifier corresponding to the leak detection cable in which said leak or fault condition is detected.

7. A leak detection system as claimed in claim 1 wherein said detecting means includes means for discriminating among a plurality of different alarm conditions, and said alarm message includes a characterization of the detected alarm condition.

8. A leak detection system as claimed in claim 1 wherein said stored representation is a list of drawing entities.

9. A leak detection system as claimed in claim 8 wherein said leak detection cables are represented in said list by polyline drawing entities.

10. A leak detection system for detecting and locating leak and fault conditions in monitored regions shown on a display and for displaying information, said system comprising:

a leak monitoring subsystem for each monitored region and including a leak detection cables containing at least one leak and fault condition responsive sensor section;

said leak monitoring subsystems each including means for detecting the existence of a leak or fault condition in said leak detection cable and means for locating the leak or fault condition at a linear distance along the length of said leak detection cable;

said leak monitoring subsystems each further including means for providing a leak or fault message including a numerical representation of said linear distance;

a leak signal processing subsystem;

a communication link between said leak monitoring subsystems and said leak signal processing subsystem;

said communication link including means for communicating a leak or fault message from each of said leak monitoring subsystem to said leak signal processing subsystem; and said leak signal processing subsystem including a graphical display device and means for repeating said leak or fault message upon said graphical display device;

said leak detection system being characterized by:

said leak signal processing subsystem including stored representations of the monitored regions in form capable of being displayed on said graphical display device;

means responsive to receipt of a leak or fault message from one of said leak monitoring subsystems for selecting the stored representation of the corresponding monitored region;

means for displaying said selected stored representation on said graphical display device;

means for converting the representation of said linear distance into the physical location of the leak or fault condition in said stored representation; and means for superimposing a leak or fault location indicator at said physical location upon said stored representation displayed on said graphical display device.

11. A method for detecting and locating leak or fault conditions in monitored regions shown on a display and for displaying leak or fault information, said method comprising:

detecting the existence of a leak or fault condition in a leak detection cable of a leak monitoring system;

locating the leak or fault at a linear distance along the length of the leak detection cable;

providing a leak or fault message including a numerical representation of the linear distance;

communication the leak or fault message from the leak monitoring subsystem to a leak signal processing subsystem including a graphical display device;

selecting a stored representation of the corresponding monitored region corresponding wherein the leak or fault condition was detected;

displaying the selected stored representation on the graphical display device;

converting the representation of the linear distance into the physical location of the leak or fault condition in the selected stored representation; and superimposing a leak or fault location marker at the physical location upon the stored representation displayed on the graphical display device.

12. A method for the graphical display of leak or fault conditions detected by linear sensors in a plurality of monitored regions comprising:

making a drawing of each monitored region;

preparing a list of drawing entities in each drawing;

including the linear sensors in each list as segmented lines;

supplementing each list with dimensional and identifying information relating to each segmented line;

generating a leak or fault message including a sensor identifier and the linear position of a detected leak or fault along the sensor length when leak or fault is detected in a monitored region;

displaying the listed drawing entities in a graphical representation of the monitored region when a leak or fault message is generated;

converting the linear position of the detected leak or fault condition to a physical location on the segmented line representing the identified sensor; and adding an leak or fault condition marker to the graphical representation at the physical location of the leak or fault condition.

* * * * *